April 20, 1948.     O. W. HOSKING     2,440,144
CORE PIN FOR MOLDING VALVE STEMS
Original Filed March 19, 1941

INVENTOR
Oakley W. Hosking
BY Johnson & Kline
ATTORNEYS

Patented Apr. 20, 1948

2,440,144

UNITED STATES PATENT OFFICE 2,440,144

CORE PIN FOR MOLDING VALVE STEMS

Oakley W. Hosking, Monroe, N. Y., assignor to Composite Rubber Products Corporation, Bridgeport, Conn., a corporation of Connecticut Original application March 19, 1941, Serial No. 384,173. Divided and this application May 15, 1945, Serial No. 593,787

3 Claims. (Cl. 18—45)

The present invention relates to an improved core pin for making, by a molding procedure, rubber valve stems for inflating air containers such as the inner tubes of motor vehicle tires, and more particularly, the present invention relates to a core pin adapted to be removably assembled with the rigid insert, prior to molding of the rubber.

The present application is a division of my application Serial No. 384,173, filed March 19, 1941, now Patent No. 2,390,026, granted November 27, 1945, which is a continuation in part of my previous application Serial No. 107,832, filed October 27, 1936 which has since matured into United States Patent No. 2,232,530, granted February 18, 1941, and of my copending application Serial No. 379,055, filed February 15, 1941, now Patent No. 2,344,932, granted March 21, 1944.

It is an object of the present invention to provide a core pin for making valve stems having means for preventing the escape of air under pressure from the passage through the stem along the contiguous surfaces of the insert and rubber, to the exterior of the stem without relying upon adherence of the rubber to the insert; to reenforce the rubber against ballooning, and against distention of the rubber walls of the passage through the stem when they cooperate with portions of the valve mechanism; and to anchor the insert in the stem in such a manner that it is secured against blowing out of the tip of the rubber body under the influence of compressed air in the bore of the stem.

It has been proposed heretofore to prevent the escape of air between contiguous surfaces of the rubber and insert by adhering the rubber to the insert, but this requires special selection of materials and special preparation of the surface of the insert.

It has also been proposed, in cases where a rubber and metal junction is exposed to compressed air, to extend the rubber interiorly of the insert so that the compressed air holds the rubber against the insert to seal the contacting surfaces against escape of air between them, but the extent of the contiguous sealing surfaces heretofore contemplated was generally so small that the seal was ineffective.

The valve stem is made according to the present invention by the use of a novel core pin in the molding process which has as an object to provide means for forming a bore through the rubber portion of the stem, requiring no pilot pins in the mold, permitting the use of rubber slugs having no apertures therein, and insuring that the passage through the stem will not be blocked by penetration of rubber into its bore; the use of the said means being adapted to simplify the operations attendant upon the introduction of portions of the stem and the rubber into the mold, and is especially adapted for mass production.

These objects are accomplished by providing a core pin which is separately assembled with an insert, especially of the aforesaid preferred form of valve stem, before molding the rubber around it; forming a solid slug of uncured rubber, and adhering it to the assembled insert and core pin; placing the resulting assembly in a suitable mold; molding and vulcanizing the rubber under heat and pressure; and finally removing the core pin from the stem after the mold contents have been removed from the mold and allowed to cool.

Other features and advantages will hereinafter appear.

Figure 1:
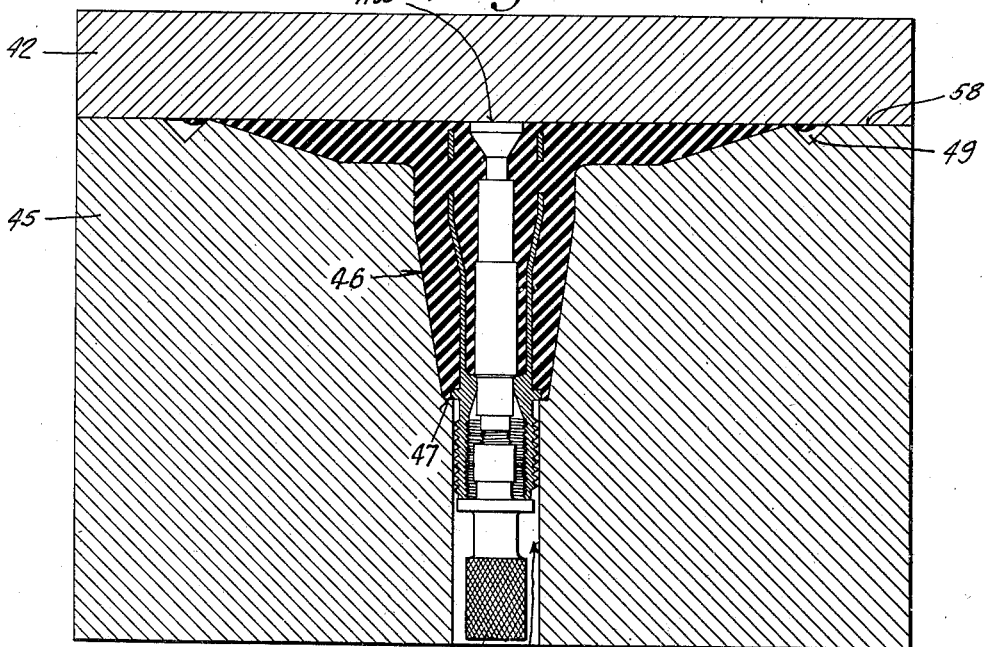
Fig. 1 is an enlarged central vertical cross-section of a mold for forming a valve stem of the present invention showing the relative positions of the metal insert, rubber, and core pin during the molding process.

The valve stem made by the apparatus of the present invention comprises a rubber body portion 10 and a rigid insert 11, preferably of metal, embedded in the rubber, said stem having a passage 12 extending from its base to its tip through the rubber and metal portions thereof.

The rubber body portion comprises a base flange 13 for securing the valve stem into an air container, and a stem portion 14 extending outwardly from the flange.

Figure 2:
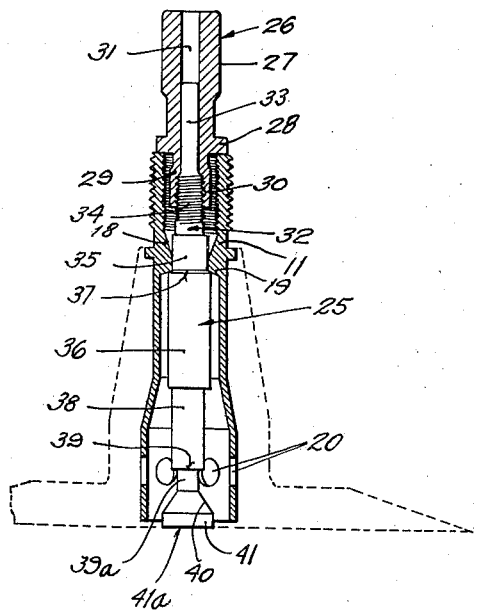
Fig. 2 is an enlarged central vertical cross-section of the metal insert of the valve stem of Fig. 1, prior to molding of the rubber portion thereof, and assembled with a core pin for forming a bore in the molded stem.
Figure 3:
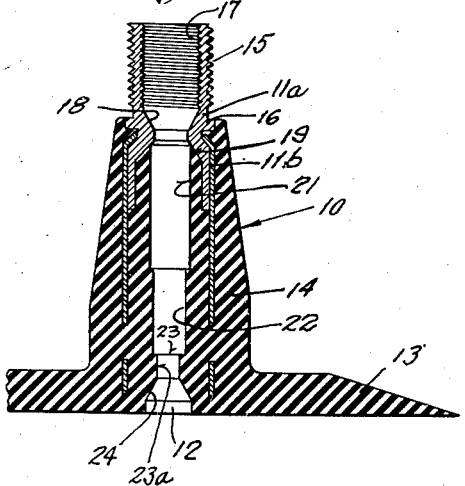
Fig. 3 is an enlarged central vertical cross-section of a modification of the valve stem of the present invention.

The rigid insert 11 comprises a tubular metal member, part of which protrudes from the tip of the rubber body 10. The insert may be formed of one piece as shown in Figs. 1 and 2 or of two pieces 11a, 11b secured together as shown in Fig. 3. The protruding portion of the insert may be provided with external threads 15, as shown, for engaging a cap or similarly threaded elements, and is preferably provided with an external annular flange 16 inwardly of said threads, the rubber of the body 10 surrounding the external surface of the insert, below said flange.

Internally, the insert 11 may be threaded adjacent its tip as indicated at 17, and provided with a conical seat 18 inwardly of the threads, said seat and threads being adapted to receive and retain a valve core of the conventional type.

Below, or inwardly of, the conical seat 18, the passage through insert 11 is widened to form an inwardly facing shoulder 19, and the rubber of the body portion 10 of the stem extends internally of said insert from its lower end or base substantially to said shoulder.

The inner portion of the insert 11 which is surrounded both internally and externally with the rubber of the body 10 extends, according to the invention, almost to the base of the body. The inner portion of the insert is skirt-like in shape, and its inner end may be of greater diameter than the portion adjacent its shoulder 19, whereby its engagement with the rubber of the body portion is rendered more effective to prevent ejection of the insert from the rubber by air under pressure within the bore of the stem, and whereby the inclusion of a greater thickness of interiorly lying rubber is made possible, a feature which is sometimes desirable, for instance, to afford increased yielding properties in the thickened portions of the rubber walls of the passage through the stem adjacent its base. Furthermore, in order to provide means for positively anchoring insert 11 in the rubber body 10, the skirt of the insert may be provided with a series of apertures 20 (see Fig. 2) through which the rubber of the body portion extends to form an interlock with the insert, retaining it against blowing out of the tip of the rubber body under the influence of air under pressure in the bore of the stem.

As indicated in the drawings, the passage 12 below shoulder 19 extends through the rubber lying interiorly of insert 11 and through the rubber base flange 13. When the stem is used with a valve core of the conventional type, passage 12 is sealed above shoulder 19. Thus the rubber forming the walls of the passage below shoulder 19 is subjected to the pressure of the compressed air in the inflated air container to which the stem is attached and is urged radially outward thereby against the contiguous interior surface of insert 11. Because of the relatively long continuous surface of the insert between shoulder 19 and apertures 20, which is contiguous to the interiorly lying rubber, this effectively prevents the escape of air from the bore of the stem which might otherwise occur by creeping of the air around the surface of insert 11 from the junction of the rubber and metal below shoulder 25 to the exterior rubber metal junction at flange 16.

Moreover, since the embedded portion of insert 11 extends almost to the base of the rubber body, it reenforces the stem portion 14 of the body for substantially its entire length and prevents ballooning of the rubber by the compressed air in passage 12.

Inwardly of the shoulder 19, the rubber walls of passage 12 are cylindrically shaped as indicated at 21, the diameter of the passage being sufficient at this point to provide ample clearance for passage of air past inwardly protruding portions of the valve core mechanism. Inwardly of cylindrical portion 21, the walls of the passage may be constructed cylindrically, as indicated at 22, but of smaller diameter than that of portion 21 since the spring of the conventional valve core which extends into the portion 22 of the passage affords sufficient clearance for passage of air.

Preferably, the cylindrical portion 22 terminates in an outwardly facing annular shoulder 23 formed in the rubber wall, said shoulder providing a support for the abutment member and the compression spring of the valve core mechanism. The lower end of insert 11 surrounds said shoulder and extends above and below the same, thus reenforcing it against distention which might cause it to give way and release the abutment member and the spring supported thereby.

Below shoulder 23, the passage 12 is constricted as indicated at 23a and may be widened to the base of the rubber flange 13 presenting an inwardly faced conical rubber valve seat 24 for cooperating with special types of valve cores, including a valve pin provided with a closure adapted to cooperate with an integral rubber valve seat within the bore of a valve stem. Such a valve core is disclosed in my previous application Serial No. 107,832 filed October 27, 1936, which has since matured into United States Patent No. 2,232,530, granted February 18, 1941, and also in my copending application Serial No. 379,055, filed February 15, 1941, now Patent No. 2,344,932, granted March 21, 1944.

The lower end of insert 11 preferably extends above and below said integral rubber valve seat, and reenforces it against such distention as would permit the blowing out of a special valve core of the latter type.

By forming the walls of the passage 12 inwardly of the shoulder 19 of rubber, a material economy in the manufacture of the valve stem is effected. Namely, if the widened cylindrical portion 21 of the passage were formed in the metal of insert 11, it would require an additional counterboring operation in the manufacture of the insert; and if a part of the narrower cylindrical portion 22 were also of metal, the counterboring operation would be even more seriously complicated. Since these cylindrical parts of the walls of the passage 12 are of rubber, they may be formed by relatively simple molding processes and the entire skirt portion may be formed by drawing or spinning.

According to the present invention, a novel core pin is employed which is first assembled with the rigid insert and is adapted during a subsequent molding operation to seal the passage through the valve stem at shoulder 19 against flow of rubber, and having a portion adapted to form a passage inwardly of said shoulder through the rubber to the base of the stem. The core pin thus performs the function ordinarily effected by means of pilot pins extending into the bore of a metal insert from one or both ends of a molding die during the molding of rubber around the insert.

As shown in Fig. 2, core pin 25 comprises two separable parts adapted to be secured together by draft means. The tip portion 26 of the core pin comprises a cylindrical member having a knurled handle 27, an annular flange 28 adapted to engage the tip of insert 11 and a boss 29, adapted to protrude into the tip of insert 11, and having an internally threaded socket 30 at its lower end. From the well of the socket, a bore 31 extends axially to the end of the knurled handle.

The core-forming member 32 of the core pin comprises a terminal stem 33 adapted to slide telescopically into the bore 31, and adjacent thereto, a threaded portion 34 is provided for engaging the threads of socket 30. A cylindrical portion 35 extending inward from the threads is adapted to fit the apertures of insert 11 between shoulder 19 and conical seat 18.

The mid-portion 36 of member 32 is also cylindrical, but of larger diameter than said aperture and is adapted to form the widened cylindrical portion 21 of passage 12 through the valve stem. At the upper end of cylindrical portion 36, adjoining cylinder 35, an annular shoulder 37 is provided which is adapted to seat against shoulder 19 and to form a seal therewith against the flow of rubber past this junction during molding.

Beyond the mid-portion 36, member 32 includes a cylindrical extension 38 adapted to form the cylindrical walls 22 of passage 12 and terminating in a shoulder 39 which forms the outwardly faced shoulder 23 in the said passage. Below shoulder 39, a reduced cylindrical portion 39a is provided to form the constriction 23a, and a conical surface 40 is provided to form the integral rubber valve seat 24 in the passage 12, member 32 terminating in a cylindrical portion 41 adapted to form the lower end of passage 12. The end surface 41a of member 32 is preferably constructed to be flush with the lower surface of the rubber base flange 13.

The core pin 25 is assembled with insert 11 by inserting core-forming member 32 into the lower end of the insert, and the tip member 26 into the tip of the insert, and then screwing threaded socket 30 over the threaded portion 34 to draw the two parts together until flange 28 is clamped against the tip of the insert and shoulder 37 is clamped against shoulder 19 to form a seal against the flow of plastic rubber past this point. Cooperation of the cylindrical portion 35 with the aperture in insert 11 above shoulder 19 and of stem 33 with the bore 31 of tip member 26 serves to center the core pin in the insert.

The mold for forming the rubber valve stem comprises an upper die 42 having a flat surface 58 for molding the base of flange 13 of the rubber body 10, and a lower die 45 having a mold cavity 46, the walls of which conform to the exterior shape of the rubber stem portion 14 as well as the upper surface of flange 13.

The inner end of the cavity 46 preferably includes a shoulder 47 for engaging annular flange 16 on the insert 11 to seal the mold cavity against egress of rubber at this point. An extension 48 of the said cavity provides space for the tip of insert 11, and for the handle 27 of the core member 25. The extension 48 is preferably open at its lower end to permit access to the knurled handle 27 of core pin 25 so that the latter may be pushed upward to eject the valve stem from the mold after the molding operation is complete.

Uncured rubber for forming the body portion 10 of the valve stem may be provided in the form of solid rubber slugs which are relatively simple to preform by extrusion while avoiding overheating which would tend to partly vulcanize the rubber.

In other valve stem molding processes where pilot pins are used, it is generally necessary to provide slugs of crude rubber having apertures therein in order to avoid rubber entering the bore of the stem during the closing of the mold before the pilot pins can seal the passage against influx of the rubber. The extrusion of apertured rubber slugs is relatively slower than solid slugs and often results in deleterious overheating of the rubber. The avoidance of this disadvantage is made possible in the present invention by the use of a core pin preassembled with the metal insert instead of pilot pins, to form the rubber bore in the stem.

After the core pin 25 is assembled with the metal insert 11, an imperforate rubber slug is adhered to the core pin 25, for instance, by merely pressing the latter into the surface of the slug. The resulting assembly is inverted and dropped into the cavity 46 of die 45 which is heated by suitable means to molding temperature. The upper die 42, also preferably heated, is lowered under pressure until the mold is closed, forcing the rubber into the cavity surrounding the core-forming member 25 and the skirt portion of insert 11. The flat-surfaced end 41a of member 32 preferably rests against the surface of the upper molding die 42. Excess rubber is forced into the usual flash groove 49 surrounding the mold cavity.

The contents of the mold is heated sufficiently to vulcanize the rubber. The mold is then opened and the core removed, for instance, by pushing upward against the end of the core pin tip member 26.

Tip member 26 is then unscrewed from the core-forming member 32 and the latter pushed out through the lower end of the valve stem. The rubber shoulder 23 and valve seat 24 yield sufficiently to permit removal of the core-forming member. This operation insures opening of the passage 12 throughout the base of the stem even if a flash of rubber has covered the end 41a of member 32 during molding. Thus, the present molding method insures the formation of the through passage in the valve stem, and effectively removes rubber which might tend to obstruct said passage.

The use of the core pin of the present invention in the above described molding process is highly advantageous for mass production. Economy is effected in the manufacture of the metal insert. Economy in time and effort is also effected in that nonapertured rubber slugs may be used which may be preadhered to the end of the core pin, whereby the entire mold contents may be dropped into the mold cavity at the same time.

In mass production methods heretofore used, the metal insert and rubber slugs were separately dropped into the mold cavities of a multiple mold, requiring the use of separate positioning or distributing racks for the rubber and metal respectively. According to the present invention, only one positioning rack is necessary to place the structures in the mold, thus simplifying the requisite machinery.

Variations and modifications may be made within the scope of this invention and portions of the improvements may be used without others.

I claim:

1. A core pin for use in a mold for forming a bore in a molded rubber valve stem having a rigid insert extending into the tip of a rubber body and at least partly embedded therein, said insert and body having coaligned bores forming a passage through the stem and said mold having a base-forming surface, comprising a bore-forming member, one end of which adapted to extend to the base-forming surface of the mold, and having a bore-forming surface terminating at an annular bearing surface adapted for engagement with a corresponding bearing surface on said insert, a separable member adapted to engage an abutment on the insert disposed outwardly relative to its bearing surface; and means independent of the mold for connecting said separable member and the bore-forming member through the bore of the insert and for drawing said members together to clamp the bearing surfaces of the insert and the core pin together in sealing relation while the separable member is supported on said abutment.

2. A core pin for use in a mold for forming a bore in a molded rubber valve stem having a rigid insert extending into the tip of a rubber body and at least partly embedded therein, said insert and body having coaligned bores forming a passage through the stem and said mold having a base-forming surface, comprising a bore-forming member, one end of which is adapted to extend to the base-forming surface of the mold and having a bore-forming surface terminating in an annular bearing surface adapted to engage a corresponding bearing surface on said insert; a separable member adapted to engage an abutment on the insert disposed outwardly relative to its bearing surface, draft means for connecting said separable member and the bore-forming member of said core pin and for drawing said members together independently of the mold to clamp the bearing surfaces of the insert and core pin in sealing relation while the separable member is supported on said abutment; means on said core pin for cooperating with the insert and centering the pin therewith on tightening said draft means; and means on said separable member and bore-forming member for cooperating with said insert for aligning said core pin and insert.

3. A core pin for use in a mold for forming a bore in a molded rubber valve stem having a rigid insert extending into the tip of a rubber body and at least partly embedded therein, said insert and body having coaligned bores forming a passage through the stem and said mold having a base-forming surface, comprising a bore-forming member, one end of which is adapted to extend to the base-forming surface of the mold and having a bore-forming surface comprising cylindrical portions of various diameters, said surfaces terminating at an annular shoulder or bearing surface facing the opposite end of said bore-forming member and adapted to engage a corresponding bearing surface at the inner end of the bore-forming portion of said insert; a co-aligned stem on said bore-forming member adapted to project into the bore of said insert having threads thereon, and a cylindrical portion adapted to fit the bore of said insert; and a clamping member having a flange for engaging the tip of said insert in abutting relation, and a threaded socket for engaging the threads on said stem, said clamping member being adapted, upon inserting the stem of the bore-forming member into the bore of the insert from the inner end of the latter, to be screwed over the threads of said stem until the said flange engages the tip of the insert to draw said bearing surfaces together in sealing relation and to align said bore-forming member with the insert while engagement of the fitted cylindrical portion of the stem in the bore of the insert centers said core pin in the insert.

OAKLEY W. HOSKING.

REFERENCES CITED

The following references are of record in the file of this patent:

UNITED STATES PATENTS

| Number | Name | Date |
| --- | --- | --- |
| 1,604,274 | Gammeter | Oct. 26, 1926 |
| 2,135,570 | Ellis | Nov. 8, 1938 |
| 2,230,879 | Bronson | Feb. 4, 1941 |
| 2,329,346 | Goff | Sept. 14, 1943 |

FOREIGN PATENTS

| Number | Country | Date |
| --- | --- | --- |
| 259,685 | Great Britain | Oct. 18, 1926 |